(12) United States Patent
Hirano et al.

(10) Patent No.: US 11,128,770 B2
(45) Date of Patent: Sep. 21, 2021

(54) IMAGE PROCESSING SYSTEM AND NON-TRANSITORY COMPUTER READABLE MEDIUM

(71) Applicant: FUJIFILM BUSINESS INNOVATION CORP., Tokyo (JP)

(72) Inventors: Tomoaki Hirano, Kanagawa (JP); Tatsuo Mishima, Kanagawa (JP); Rie Muraishi, Kanagawa (JP); Manabu Hayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/814,093

(22) Filed: Mar. 10, 2020

(65) Prior Publication Data

US 2021/0075924 A1  Mar. 11, 2021

(30) Foreign Application Priority Data

Sep. 5, 2019 (JP) .............................. JP2019-162202

(51) Int. Cl.
*H04N 1/00* (2006.01)
*G06F 3/12* (2006.01)

(52) U.S. Cl.
CPC ....... *H04N 1/00482* (2013.01); *G06F 3/1205* (2013.01); *G06F 3/1226* (2013.01); *G06F 3/1232* (2013.01); *G06F 3/1253* (2013.01); *G06F 3/1291* (2013.01); *H04N 1/00424* (2013.01); *H04N 1/00474* (2013.01)

(58) Field of Classification Search
None
See application file for complete search history.

(56) References Cited

U.S. PATENT DOCUMENTS

| 6,088,120 | A  | * | 7/2000 | Shibusawa | ............ | G06F 3/1204 |
| | | | | | | 358/1.15 |
| 6,940,615 | B1 | * | 9/2005 | Shima | .................... | G06F 3/124 |
| | | | | | | 358/1.15 |
| 2002/0030840 | A1 | * | 3/2002 | Itaki | ................... | H04N 1/00482 |
| | | | | | | 358/1.13 |
| 2009/0284783 | A1 | * | 11/2009 | Kaneda | ............... | H04N 1/32502 |
| | | | | | | 358/1.15 |
| 2010/0185783 | A1 | * | 7/2010 | Hamaguchi | ........ | H04N 1/00344 |
| | | | | | | 710/8 |
| 2013/0121620 | A1 | * | 5/2013 | Suzuki | ............... | H04N 1/00954 |
| | | | | | | 382/307 |
| 2013/0314732 | A1 | * | 11/2013 | Nakabayashi | ........ | G06F 3/1204 |
| | | | | | | 358/1.13 |

FOREIGN PATENT DOCUMENTS

JP            5564323 B2      7/2014

* cited by examiner

*Primary Examiner* — Miya J Williams
(74) *Attorney, Agent, or Firm* — Oliff PLC

(57) ABSTRACT

An image processing system includes a processor configured to present all functions provided by plural image processing apparatuses connected to one another on a network, the plural image processing apparatuses providing different functions and receive, as shared setting information, settings of functions to be used by all the plural image processing apparatuses among all the functions presented.

16 Claims, 10 Drawing Sheets

FIG. 5

| IMAGE PROCESSING SETTINGS | |
|---|---|
| ITEM | VALUE |
| COLOR MODE | COLOR |
| TRAY | TRAY 1 |
| DOUBLE-SIDED | LONG-SIDE BINDING |
| PUNCHING | LEFT TWO POINTS |
| STAPLING | UPPER-LEFT |

FIG. 9A

| IMAGE PROCESSING SETTINGS | |
|---|---|
| ITEM | VALUE |
| COLOR MODE | BLACK-AND-WHITE |
| TRAY | TRAY 1 |
| DOUBLE-SIDED | LONG-SIDE BINDING |
| PUNCHING | NONE |
| STAPLING | NONE |

FIG. 9B

| IMAGE PROCESSING SETTINGS | |
|---|---|
| ITEM | VALUE |
| COLOR MODE | BLACK-AND-WHITE |
| PUNCHING | NONE |
| STAPLING | NONE |

IMAGE PROCESSING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-162202 filed Sep. 5, 2019.

BACKGROUND

(i) Technical Field

The present disclosure relates to an image processing system and a non-transitory computer readable medium.

(ii) Related Art

Japanese Patent No. 5564323 describes a technique for, when a user customizes and generates a display screen to be displayed on a display, enabling image forming apparatuses of different models to use the same display screen data for the same function while preventing image data regarding the same display screen from being redundantly saved.

SUMMARY

Aspects of non-limiting embodiments of the present disclosure relate to share settings of more functions compared to when a configuration is employed in which functions to be used by all of plural image processing apparatuses on a network are selected from all functions that can be provided by one of the plural image processing apparatuses.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing system including a processor configured to present all functions provided by a plurality of image processing apparatuses connected to one another on a network, the plurality of image processing apparatuses providing different functions and receive, as shared setting information, settings of functions to be used by all the plurality of image processing apparatuses among all the functions presented.

BRIEF DESCRIPTION OF THE DRAWINGS

An exemplary embodiment of the present disclosure will be described in detail based on the following figures, wherein:

FIG. 5 illustrates an example of image processing settings of a virtual image processing apparatus displayed on a display;

FIG. 9A is a diagram illustrating shared setting information after update and FIG. 9B is a diagram illustrating unique setting information.

DETAILED DESCRIPTION

An image processing system 10 according to an exemplary embodiment will be described hereinafter.

Figure 1:
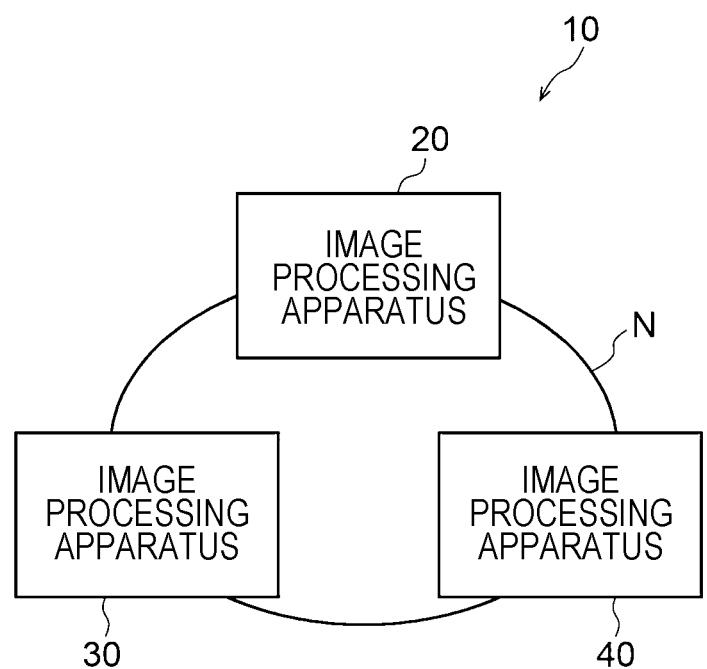
FIG. 1 is a diagram illustrating the configuration of an image processing system according to an exemplary embodiment.

As illustrated in FIG. 1, image processing apparatuses 20, 30, and 40 are connected to one another in the image processing system 10 over a network N. The network N is, for example, the Internet, a local area network (LAN), a wide area network (WAN), or the like.

The image processing apparatuses 20, 30, and 40 are multifunction peripherals (MFPs) having functions of performing various types of image processing such as scanning, printing, copying, and fax (facsimile). Functions that can be provided by the image processing apparatuses 20, 30, and 40 are different from one another. Functions that can be provided are different from one another because of, for example, presence or absence of a function of performing a certain type of image processing such as scanning or fax, presence or absence of a reversal device for double-sided printing, presence or absence of a post-processing function executed after a certain type of image processing such as stapling or punching, or the like. Even when the number of functions that can be provided is the same between the image processing apparatuses 20, 30, and 40, functions that can be provided are regarded as different from one another if types of function that can be provided are different from one another.

The image processing system 10 can make settings as to image processing (hereinafter referred to as "image processing settings") for each user in the image processing apparatuses 20, 30, and 40. The image processing settings are, for example, settings for invariably performing color printing when printing is performed as image processing. The image processing system 10 can share image processing settings made in one of the image processing apparatuses 20, 30, and 40 on the network N with the other two of the image processing apparatuses 20, 30, and 40.

Next, the hardware configuration of the image processing apparatuses 20, 30, and 40 will be described. The hardware configuration is the same between the image processing apparatuses 20, 30, and 40, and the image processing apparatus 30 will be taken as an example for the same components.

Figure 2:
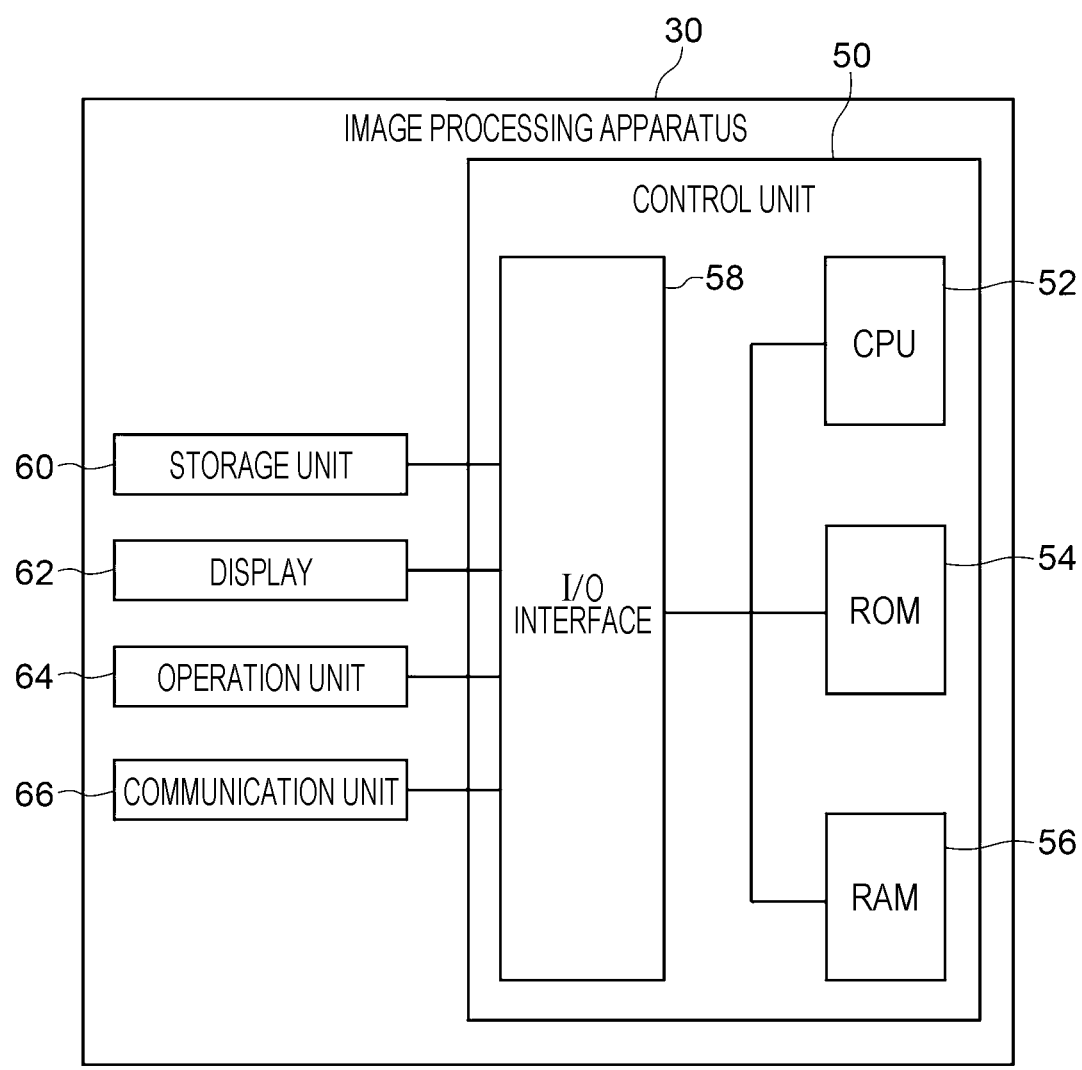
FIG. 2 is a block diagram illustrating the hardware configuration of an image processing apparatus.

FIG. 2 is a block diagram illustrating the hardware configuration of the image processing apparatus 30.

As illustrated in FIG. 2, the image processing apparatus 30 includes a control unit 50 that controls the operation of the image processing apparatus 30. In the control unit 50, a central processing unit (CPU) 52, a read-only memory (ROM) 54, a random-access memory (RAM) 56, and an input/output (I/O) interface 58 are communicably connected to one another through a bus.

The CPU 52 executes various programs and controls the other components. That is, the CPU 52 reads a program from the ROM 54 and executes the program using the RAM 56 as a working area. The CPU 52 controls the other components and performs various arithmetic processes in accordance with programs stored in the ROM 54.

The ROM 54 stores various programs and various pieces of data. The various programs include at least an image processing program for causing computers to function as the CPUs 52 of the image processing apparatuses 20, 30, and 40. The image processing program may be installed on the image processing apparatuses 20, 30, and 40 in advance, or stored in a nonvolatile storage medium or distributed over the network N and then installed on the image processing apparatuses 20, 30, and 40. Examples of the nonvolatile storage medium include a compact disc read-only memory (CD-ROM), a magneto-optical (MO) disk, a hard disk drive (HDD), a digital versatile disc read-only memory (DVD-ROM), a flash memory, and a memory card.

The RAM 56 temporarily stores a program or data as a working area.

A storage unit 60, a display 62, an operation unit 64, and a communication unit 66 are connected to the I/O interface 58.

As the storage unit 60, for example, an HDD, a solid-state drive (SSD), or a flash memory is used. The storage units 60 of the image processing apparatuses 20, 30, and 40 can store shared setting information, which indicates settings of functions to be used by all the image processing apparatuses 20, 30, and 40, and unique setting information, which indicates settings of functions uniquely used by one of the image processing apparatuses 20, 30, and 40. Details will be described later.

As the display 62, for example, a liquid crystal display (LCD) or an organic electroluminescent (EL) display is used. A touch panel is integrated with the display 62.

The operation unit 64 is provided with operation keys for receiving various instructions from a user of the image processing apparatus 30.

The display 62 and the operation unit 64 receive various instructions from the user. The various instructions include, for example, an instruction to start scanning and an instruction to start copying. The display 62 displays results of processes performed in accordance with instructions from the user and various pieces of information such as notifications about processes.

The communication unit 66 is connected to the network N and communicates with the other image processing apparatuses 20 and 40 over the network N.

Next, a process for setting and saving shared setting information will be described with reference to FIGS. 3 to 5. It is assumed in FIGS. 3 to 5 that the image processing apparatus 20 is operated by a user and shared setting information regarding printing is used.

Figure 3:
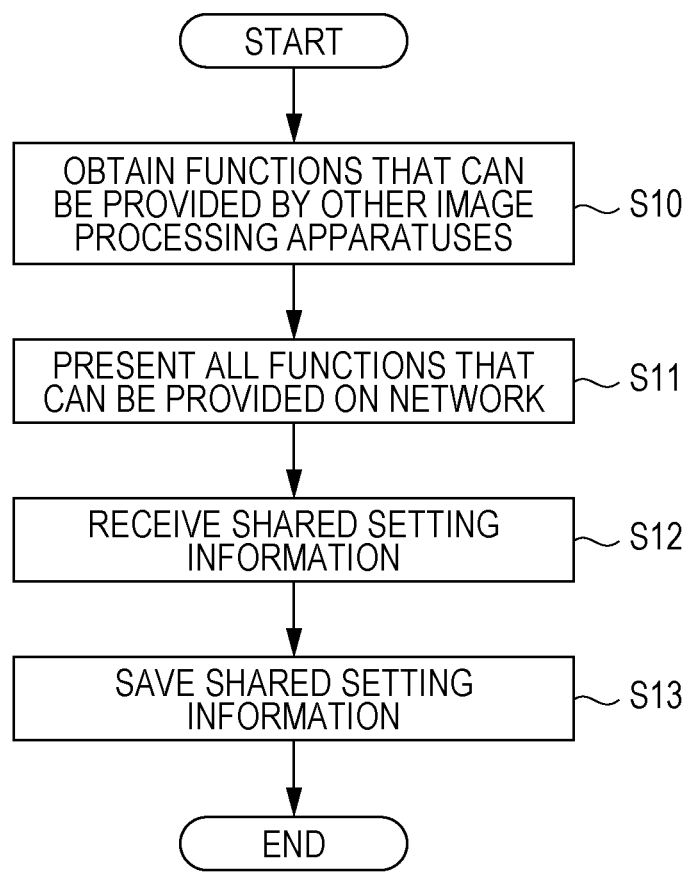
FIG. 3 is a flowchart illustrating a process for setting and saving shared setting information.

In step S10 illustrated in FIG. 3, the CPU 52 of the image processing apparatus 20 obtains functions that can be provided by the other image processing apparatuses 30 and 40. The process then proceeds to step S11.

In step S10, first, a user (hereinafter referred to as a "certain user") logs in the image processing apparatus 20 using authentication information regarding himself/herself. Next, the CPU 52 of the image processing apparatus 20 receives image processing settings to be used by all the image processing apparatuses 20, 30, and 40 on the network N as a result of an operation performed by the certain user. Next, the CPU 52 of the image processing apparatus 20 outputs instructions to the other image processing apparatuses 30 and 40 to cause the image processing apparatuses 30 and 40 to transmit, to the image processing apparatus 20, functions that can be provided by the image processing apparatuses 30 and 40, respectively. The CPU 52 of the image processing apparatus 20 then obtains the functions that can be provided by the image processing apparatuses 30 and 40 transmitted from the image processing apparatuses 30 and 40.

Figure 4:
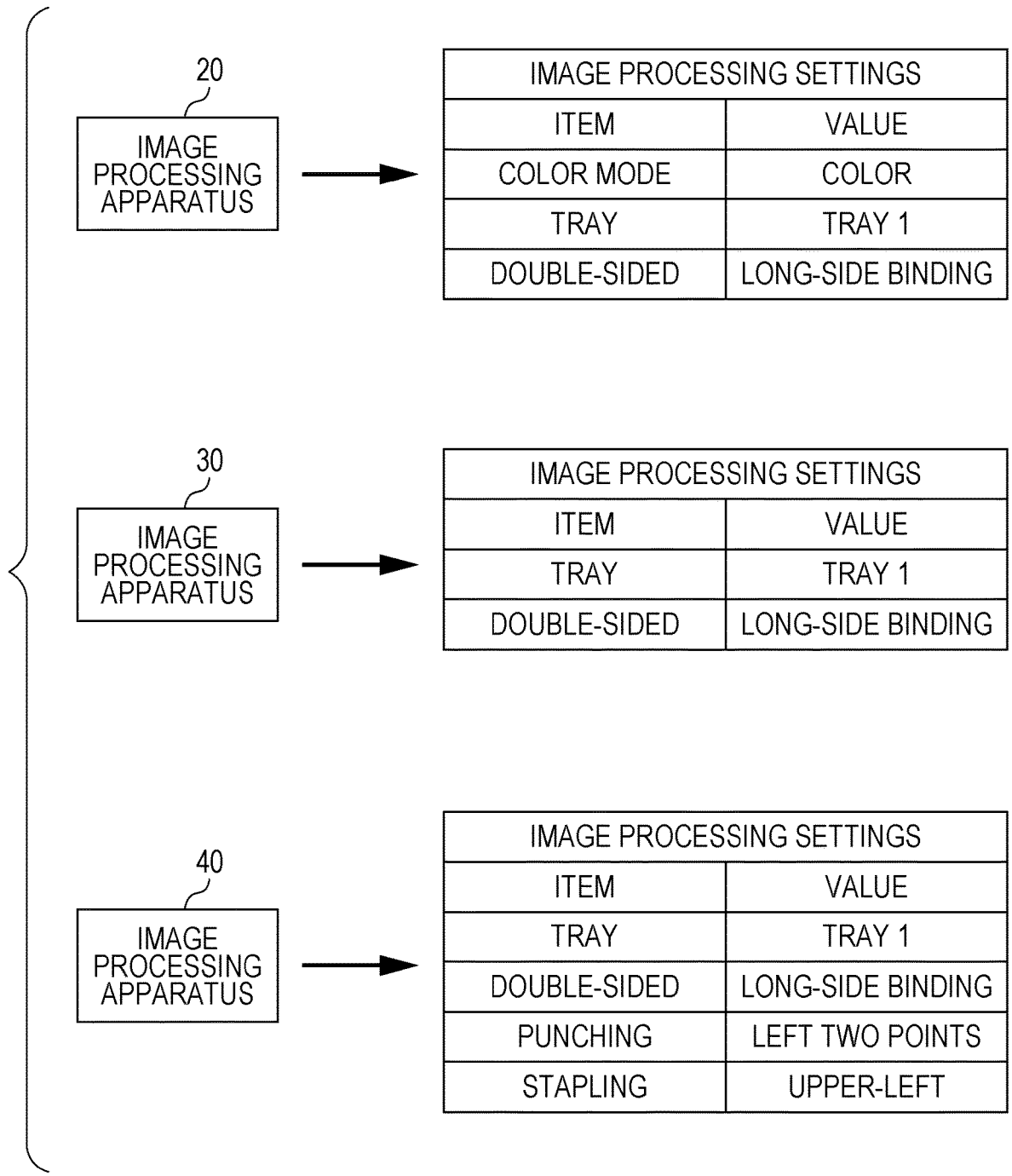
FIG. 4 is a diagram illustrating functions that can be provided by each image processing apparatus.

FIG. 4 illustrates an example of functions that can be provided by the image processing apparatuses 20, 30, and 40. As illustrated in FIG. 4, the functions that can be provided by the image processing apparatuses 20, 30, and 40 are indicated by "image processing settings", which include "item" and "value", in which data corresponding to "item" is set.

The image processing apparatus 20 includes three items, namely "color mode", "tray", and "double-sided", for example, as the image processing settings. These three items are the functions that can be provided by the image processing apparatus 20. A value corresponding to "color mode" is "color", a value corresponding to "tray" is "tray 1", and a value corresponding to "double-sided" is "long-side binding".

The image processing apparatus 30 includes two items, namely "tray" and "double-sided", as the image processing settings. These two items are the functions that can be provided by the image processing apparatus 30. A value corresponding to "tray" is "tray 1", and a value corresponding to "double-sided" is "long-side binding".

The image processing apparatus 40 includes four items, namely "tray", "double-sided", "punching", and "stapling", as the image processing settings. These four items are the functions that can be provided by the image processing apparatus 40. A value corresponding to "tray" is "tray 1", a value corresponding to "double-sided" is "long-side binding", a value corresponding to "punching" is "left two points", and a value corresponding to "stapling" is "upper-left".

Although an example of the value set for each item has been mentioned above, plural values are provided for each item, and a value selected by the certain user is set. In addition to the values mentioned above, for example, values corresponding to "color mode" include "black-and-white", values corresponding to "tray" include "tray 2" and "tray 3", values corresponding to "double-sided" include "single-sided", values corresponding to "punching" include "none", and values corresponding to "stapling" also include "none". The values corresponding to each item are not limited to those mentioned above.

In step S11 illustrated in FIG. 3, the CPU 52 of the image processing apparatus 20 presents all the functions that can be provided by the image processing apparatuses 20, 30, and 40 on the network N (hereinafter simply referred to as "all functions"). First, the CPU 52 of the image processing apparatus 20 generates a virtual image processing apparatus having all the functions by integrating together the functions that can be provided by the other image processing apparatuses 30 and 40 obtained in step S10 and the functions that can be provided by the image processing apparatus 20. The CPU 52 of the image processing apparatus 20 then displays image processing settings of the generated virtual image processing apparatus on the display 62 of the image processing apparatus 20 as an operation screen of the virtual image processing apparatus. The process then proceeds to step S12.

FIG. 5 illustrates an example of the image processing settings of the virtual image processing apparatus displayed on the display 62 of the image processing apparatus 20. As illustrated in FIG. 5, the display 62 of the image processing apparatus 20 displays five items, namely "color mode", "tray", "double-sided", "punching", and "stapling", as the image processing settings of the virtual image processing apparatus. The display 62 of the image processing apparatus 20 also displays "color" as the value corresponding to "color mode", "tray 1" as the value corresponding to "tray", "long-side binding" as the value corresponding to "double-sided", "left two points" as a value corresponding to "punching", and "upper-left" as a value corresponding to "stapling".

The display 62 of the image processing apparatus 20 thus displays all the functions, including functions that cannot be provided by the image processing apparatus 20.

In step S12 illustrated in FIG. 3, the CPU 52 of the image processing apparatus 20 receives, as shared setting information, image processing settings selected by the certain user from all the functions presented in step S11. The process then proceeds to step S13.

The shared setting information received by the CPU 52 of the image processing apparatus 20 in step S12 includes five items, namely "color mode", "tray", "double-sided", "punching", and "stapling". The value corresponding to "color mode" is "color", the value corresponding to "tray" is "tray 1", the value corresponding to "double-sided" is "long-side binding", the value corresponding to "punching" is "left two points", and the value corresponding to "stapling" is "upper-left".

In step S13 illustrated in FIG. 3, the CPU 52 of the image processing apparatus 20 saves the shared setting information received in step S12. In the present exemplary embodiment, the shared setting information is saved to the storage unit 60 of the image processing apparatus 20, 30, or 40 on the network N, whichever is a master apparatus. In the present exemplary embodiment, the image processing apparatus 20 is the master apparatus. The process then ends.

Next, a process for determining a display mode for image processing settings to be displayed on the display 62 of the image processing apparatus 30 after the shared setting information set in the image processing apparatus 20 is transmitted to the image processing apparatus 30 will be described with reference to FIGS. 6 and 7. It is assumed in FIGS. 6 and 7 that shared setting information regarding printing is used and the shared setting information is saved in the image processing apparatus 20, which is the master apparatus.

Figure 6:
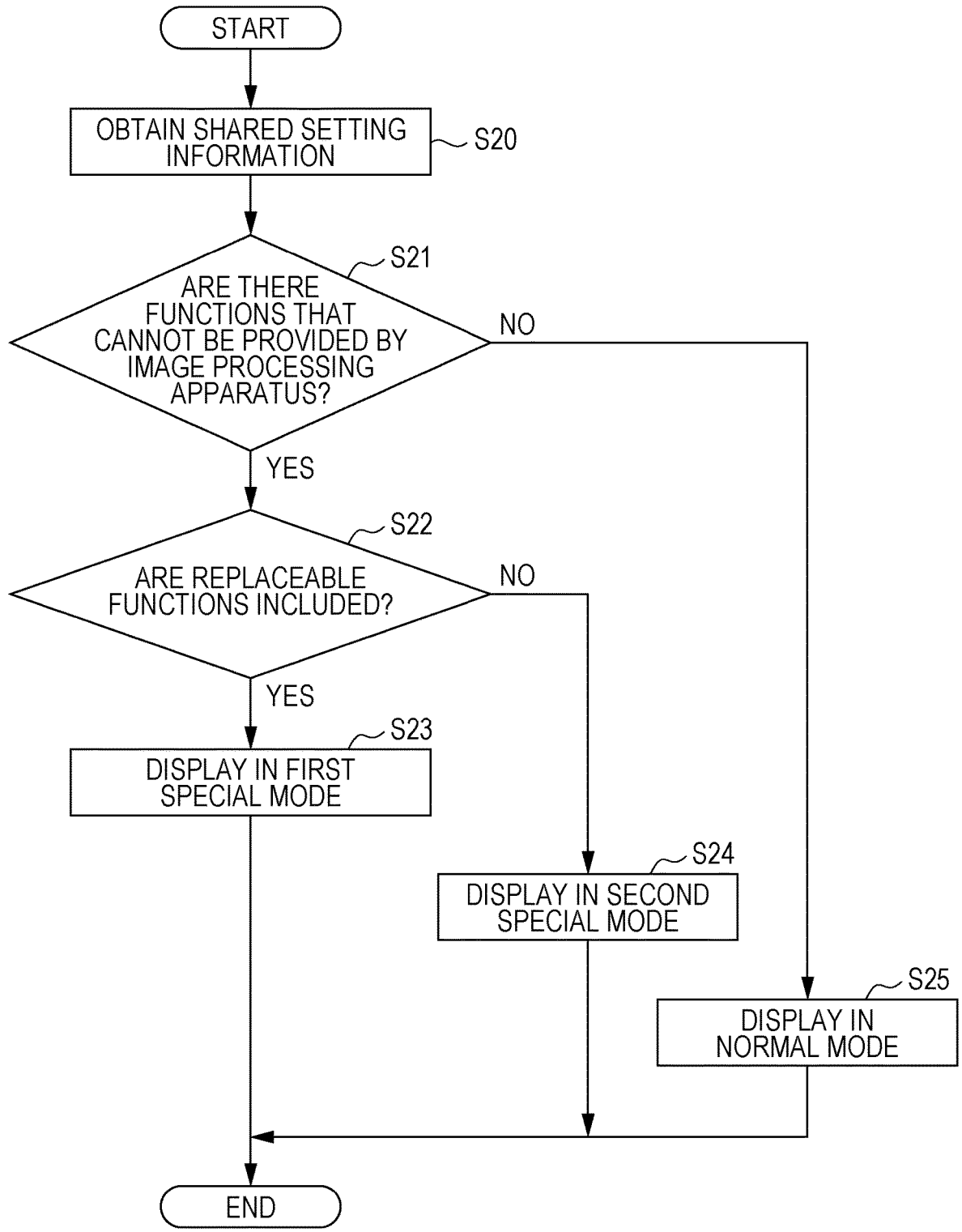
FIG. 6 is a flowchart illustrating a process for determining a display mode for image processing settings to be displayed on a display of an image processing apparatus.

In step S20 illustrated in FIG. 6, the CPU 52 obtains the shared setting information saved in the storage unit 60 of the image processing apparatus 20, which is the master apparatus. The process then proceeds to step S21.

In step S20, first, the certain user logs in the image processing apparatus 30 using the authentication information regarding himself/herself. Next, the CPU 52 receives an instruction to obtain the shared setting information set by the certain user as a result of an operation performed by the certain user. The CPU 52 then obtains, over the network N, the shared setting information set by the certain user and saved in the storage unit 60 of the image processing apparatus 20, which is the master apparatus. The CPU 52 then receives the image processing settings to be used in the image processing apparatus 30 using the obtained shared setting information.

In step S21, the CPU 52 determines whether the shared setting information obtained in step S20 includes functions that cannot be provided by the image processing apparatus 30. The functions that cannot be provided by the image processing apparatus 30 in step S21 refer to functions that cannot be provided by the image processing apparatus 30 in image processing corresponding to the shared setting information obtained in step S20. Since the image processing to be performed here is printing, for example, whether printing functions that can be provided by the virtual image processing apparatus include printing functions that cannot be provided by the image processing apparatus 30 is determined. If so, the process proceeds to step S22, and if not, the process proceeds to step S25.

In step S22, the CPU 52 determines whether the functions that cannot be provided by the image processing apparatus 30 include functions that can be replaced by other functions (replaceable functions). If so, the process proceeds to step S23, and if not, the process proceeds to step S24.

Replaceable functions refer to functions that can be replaced by functions that can be provided by an image processing apparatus that has received shared setting information among functions that can be provided by a virtual image processing apparatus.

The functions that cannot be provided by the image processing apparatus 30 are, for example, "color mode", "punching", and "stapling". That is, the image processing apparatus 30 does not have a color printing function, a punching function, and a stapling function. The image processing apparatus 30, however, can provide a black-and-white printing function. The item "color mode", therefore, is a replaceable function, and the value corresponding to "color mode" can be replaced by "black-and-white", which is a function that can be provided by the image processing apparatus 30. The items "punching" and "stapling", on the other hand, are functions that cannot be replaced by the functions that can be provided by the image processing apparatus 30, that is, are not replaceable functions. In this case, "none" is set as the values corresponding to the items "punching" and "stapling".

In step S23, the CPU 52 displays the items on the display 62 in a first special mode. The process then ends. In the first special mode, the functions that can be provided by the image processing apparatus 30, the functions that cannot be provided by the image processing apparatus 30, and the function newly employed as a result of the replacement are displayed on the display 62 in different modes.

In step S24, the CPU 52 displays the items on the display 62 in a second special mode. The process then ends. In the second special mode, the functions that can be provided by the image processing apparatus 30 and the functions that cannot be provided by the image processing apparatus 30 are displayed on the display 62 in different modes.

In step S25, the CPU 52 displays the items on the display 62 in a normal mode. The process then ends. In the normal mode, all the functions are displayed on the display 62 in the same mode.

Figure 7:
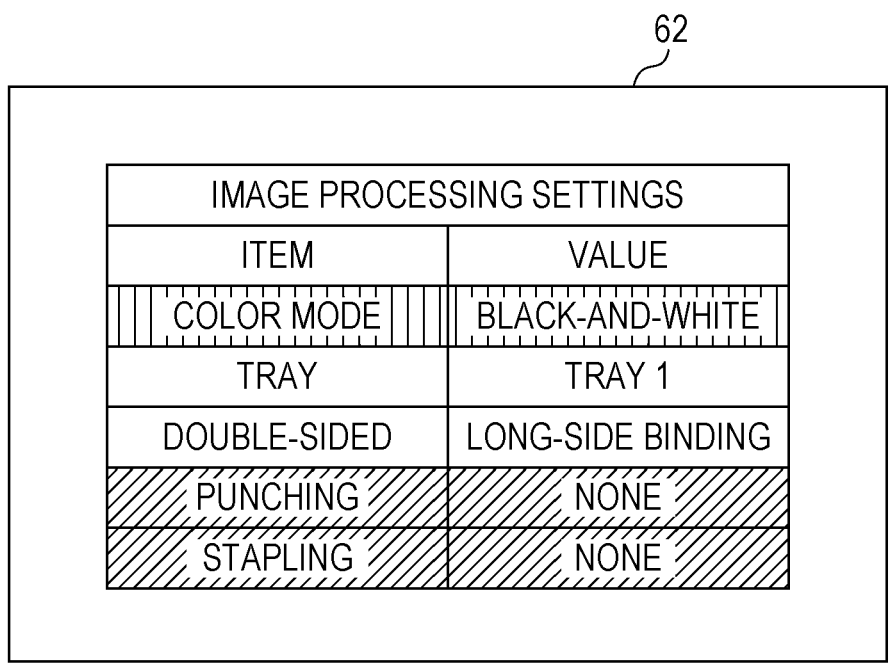
FIG. 7 illustrates an example of the image processing settings of the image processing apparatus displayed on the display of the image processing apparatus.

FIG. 7 illustrates an example of the image processing settings of the image processing apparatus 30 displayed on the display 62 of the image processing apparatus 30. As illustrated in FIG. 7, the display 62 displays the five items, namely "color mode", "tray", "double-sided", "punching", and "stapling", as the image processing settings of the image processing apparatus 30. The display 62 also displays "black-and-white" as the value corresponding to "color mode", "tray 1" as the value corresponding to "tray", "long-side binding" as the value corresponding to "double-sided", "none" as the value corresponding to "punching", and "none" as the value corresponding to "stapling".

As described above, if a function that cannot be provided by the image processing apparatus 30 can be replaced by another function, the CPU 52 replaces the function with the other function. Here, the CPU 52 switches the value corresponding to the item "color mode" from "color" to "black-and-white". If a function that cannot be provided by the image processing apparatus 30 cannot be replaced by another function, on the other hand, the CPU 52 sets, in the second special mode, "none" as a value corresponding to the item of the function that cannot be provided. Here, the CPU 52 sets "none" as the values corresponding to the items "punching" and "stapling".

The CPU 52 then displays the functions that can be provided by the image processing apparatus 30, the functions that cannot be provided by the image processing apparatus 30, and the function newly employed as a result of the replacement on the display 62 in different modes. Here, the CPU 52 displays, on the display 62 in the first special mode, rows of "tray" and "double-sided", which are the functions that can be provided by the image processing apparatus 30, in a blank display mode, rows of "punching" and "stapling", which are the functions that cannot be provided by the image processing apparatus 30, in a diagonal hatching display mode, and a row of "color mode", which is the function newly employed as a result of the replacement, in a vertical hatching display mode.

Next, a process for determining a method for saving the image processing settings of the image processing apparatus 30 will be described with reference to FIGS. 8 to 9B. It is assumed in FIGS. 8 to 9B that shared setting information regarding printing is used.

Here, the image processing system 10 can overwrite the shared setting information saved in the image processing apparatus 20, which is the master apparatus, with image processing settings of one of the image processing apparatuses 20, 30, and 40 (e.g., the image processing apparatus 30) on the network N. It is assumed, for example, that the usability of image processing settings based on shared setting information set in the image processing apparatus 20 is not desirable in the image processing apparatus 30 and the user has changed the image processing settings in the image processing apparatus 30 on a screen displayed in any of steps S23 to S25 illustrated in FIG. 6. If the usability of new image processing settings is desirable and the user desires to share the image processing settings with the other image processing apparatuses 20 and 40 on the network N, the user might overwrite current shared setting information.

Alternatively, the image processing system 10 can save the new image processing settings of the image processing apparatus 30 as unique setting information, which is uniquely used in the image processing apparatus 30, instead of overwriting the current shared setting information. The unique setting information is saved when, for example, the user does not desire to change the current shared setting information but desires to save the image processing settings dedicated to the image processing apparatus 30.

Figure 8:
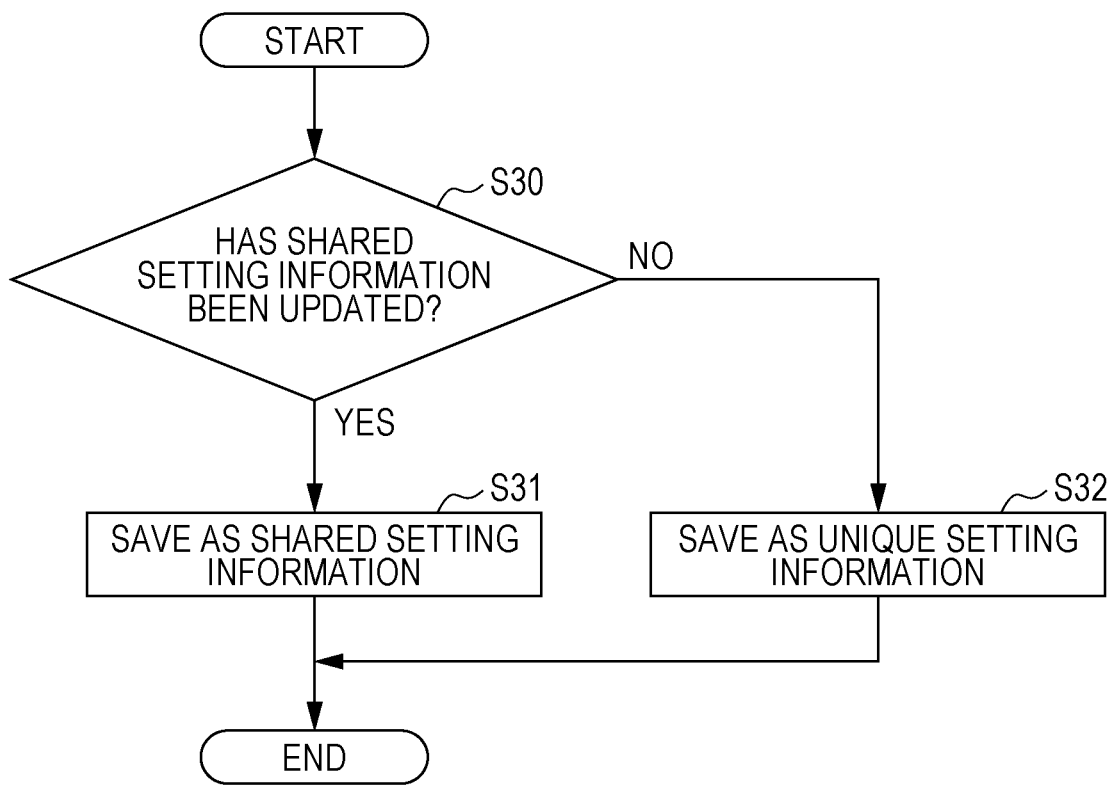
FIG. 8 is a flowchart illustrating a process for determining a method for saving the image processing settings of the image processing apparatus.

In step S30 illustrated in FIG. 8, the CPU 52 determines whether shared setting information has been updated. If so, the process proceeds to step S31, and if not, the process proceeds to step S32.

The update of shared setting information refers to determining of the image processing settings of the image processing apparatus 30 as image processing settings to be used by all the image processing apparatuses 20, 30, and 40 on the network N, that is, overwriting of current shared setting information. For example, after making the image processing settings of the image processing apparatus 30, the CPU 52 displays, on the display 62, a selection screen for determining whether to update shared setting information and, if the certain user determines that the shared setting information is to be updated, determines that the shared setting information has been updated. Alternatively, after making the image processing settings of the image processing apparatus 30, the CPU 52 may display, on the display 62, a selection screen for determining whether to update shared setting information with the image processing settings or uniquely use the image processing settings in the image processing apparatus 30 without updating shared setting information.

In step S31, the CPU 52 causes the image processing apparatuses 20, 30, and 40 on the network N to save the image processing settings of the image processing apparatus 30 as shared setting information, which can be used by all the image processing apparatuses 20, 30, and 40. In this case, the image processing settings of the image processing apparatus 30 are transmitted to the image processing apparatus 20, which is the master apparatus, over the network N, and the CPU 52 of the image processing apparatus 20 overwrites current shared setting information stored in the storage unit 60 with the image processing settings. The process then ends.

FIG. 9A is a diagram illustrating the shared setting information after the update. As illustrated in FIG. 9A, the shared setting information after the update includes "color mode", "tray", "double-sided", "punching", and "stapling". The value corresponding to "color mode" is "black-and-white", the value corresponding to "tray" is "tray 1", the value corresponding to "double-sided" is "long-side binding", the value corresponding to "punching" is "none", and the value corresponding to "stapling" is "none". The shared setting information after the update thus reflects a result of the setting of the shared setting information before the update (refer to FIG. 5) to the image processing apparatus 30, and the values corresponding to "color mode", "punching", and "stapling" have been changed from those in the shared setting information before the update.

In step S32 illustrated in FIG. 8, the CPU 52 saves the image processing settings of the image processing apparatus 30 to the storage unit 60 as unique setting information, which is uniquely used by the image processing apparatus 30. The process then ends.

FIG. 9B is a diagram illustrating the unique setting information. As illustrated in FIG. 9B, the unique setting information includes "color mode", "punching", and "stapling". The value corresponding to "color mode" is "black-and-white", the value corresponding to "punching" is "none", and the value corresponding to "stapling" is "none". The unique setting information thus includes only differences between the shared setting information before the shared setting information is set to the image processing apparatus 30 and the shared setting information after the shared setting information is set to the image processing apparatus 30.

The unique setting information is then saved to the storage unit 60 of the image processing apparatus 30 in which the certain user has logged. That is, the shared setting information stored in the storage unit 60 of the image processing apparatus 20, which is the master apparatus, remains the same.

The saved unique setting information is used as follows.

When the certain user logs in the image processing apparatus 30 and uses the printing function on another occasion, for example, the CPU 52 displays, on the display 62, a selection screen for determining whether to apply the unique setting information when the image processing settings to be used by the image processing apparatus 30 are received. If the certain user determines that the unique setting information is to be applied, the CPU 52 receives the image processing settings to be used by the image processing apparatus 30, the image processing settings being obtained by applying the unique setting information to the obtained shared setting information. If the unique setting information is applied to the shared setting information, redundant information between the shared setting information and the unique setting information is replaced by corresponding pieces of the unique setting information. When the unique setting information illustrated in FIG. 9B is applied to the shared setting information illustrated in FIG. 5, for example, the image processing settings to be used by the image processing apparatus 30 are those illustrated in FIG. 9A.

Modifications

If there is a function that cannot be provided by one of the image processing apparatuses 20, 30 and 40 (hereinafter referred to as a "first image processing apparatus"), the CPUs 52 of the others of the image processing apparatuses 20, 30, and 40 on the network N may cause the display 62 of the first image processing apparatus to display positional information regarding another of the image processing apparatuses 20, 30, and 40 (hereinafter referred to as a "second image processing apparatus") that can provide the function that cannot be provided by the first image processing apparatus.

Figure 10:
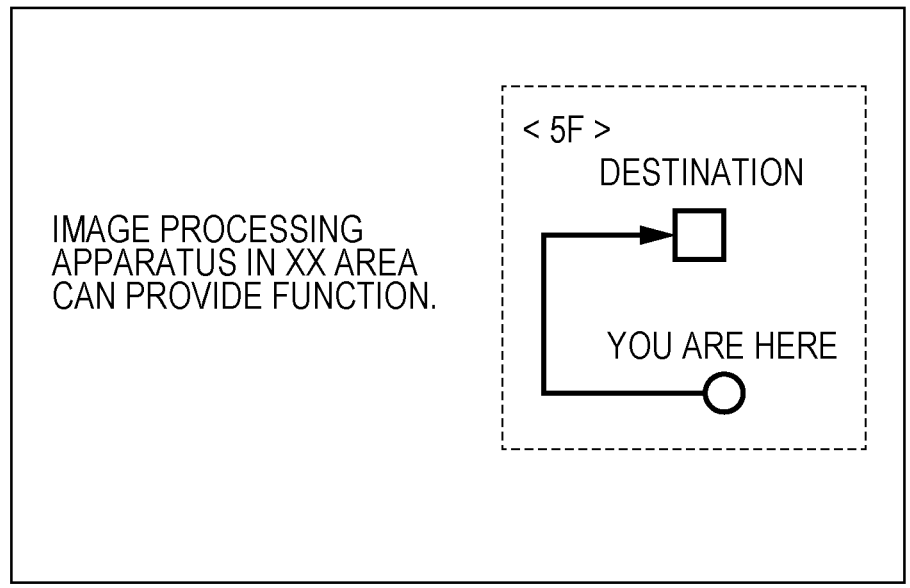
FIG. 10 illustrates an example of positional information regarding a certain image processing apparatus displayed on the display of the image processing apparatus.

FIG. 10 illustrates an example of the positional information regarding the certain image processing apparatus displayed on the display 62 of the first image processing apparatus. As illustrated in FIG. 10, the display 62 of the first image processing apparatus displays, as the positional information, text indicating a position at which the second image processing apparatus is provided and a map for guiding the user to the position at which the second image processing apparatus is provided from a current position at which the first image processing apparatus is provided. As a result, according to the present exemplary embodiment, the user can recognize the position of the second image processing apparatus that can provide the function that cannot be provided by the first image processing apparatus. The positional information need not include both the text and the map but may include either the text or the map.

The CPU 52 of the image processing apparatuses 20, 30, and 40 other than the first and second image processing apparatuses may receive, for the first image processing apparatus, an image processing instruction based on the function that cannot be provided by the first image processing apparatus and, if the image processing instruction can be transferred, transfer the image processing instruction to the second image processing apparatus. If the image processing is printing, for example, the CPU 52 of the others of the image processing apparatuses 20, 30, and 40 other than the first and second image processing apparatuses may transfer a printing instruction received by the first image processing apparatus to the second image processing apparatus.

As a result, according to the present exemplary embodiment, image processing time of the second image processing apparatus is reduced compared to when a configuration is employed in which the image processing apparatuses 20, 30, and 40 do not transfer image processing instructions to one another.

In the above exemplary embodiment, when shared setting information is updated, the shared setting information is overwritten, and new shared setting information is saved. Alternatively, when shared setting information is updated, new shared setting information may be saved in addition to the shared setting information. When plural types of shared setting information are to be saved, an identifier for identifying each of the plural types of shared setting information is desirably input. That is, when shared setting information is updated, the shared setting information is overwritten or new shared setting information is added to the shared setting information.

In the above exemplary embodiment, when unique setting information is saved, the certain user saves the unique setting information to an image processing apparatus in which the certain user has logged. Alternatively, the unique setting information may be saved to an image processing apparatus on the network N that can provide the same functions as the image processing apparatus in which the certain user has logged. As a result, the unique setting information can be applied to the image processing apparatus on the network N that can provide the same functions.

In the above exemplary embodiment, shared setting information is saved to an image processing apparatus that is a master apparatus. Alternatively, shared setting information may be saved to a cloud server or each of the image processing apparatuses 20, 30, and 40 on the network N.

In the above exemplary embodiment, the process for setting shared setting information corresponding to printing as image processing has been described. Image processing for which shared setting information can be set, however, is not limited to printing, and any type of image processing, such as copying or fax, may be applied.

In the above exemplary embodiment, a slave image processing apparatus that has obtained shared setting information from a master image processing apparatus determines a display mode for the shared setting information to be displayed on a display thereof. Alternatively, the master image processing apparatus may determine the display mode for the shared setting information to be displayed on the display of the slave image processing apparatus and transmit the determined display mode.

In the above exemplary embodiment, the CPU 52 of each of the image processing apparatuses 20, 30, and 40 is an example of a processor. In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing system comprising:
a processor configured to
present, in a single screen, all functions provided by a plurality of image processing apparatuses connected to one another on a network, the plurality of image processing apparatuses providing different functions, wherein the all functions presented in the single screen are presented as functions of one virtual apparatus; and
receive from a user, as shared setting information, settings of functions to be used by all the plurality of image processing apparatuses on the network, among all the functions presented in the single screen, wherein
the shared setting information is stored in a single one of the plurality of image processing apparatuses on the network, and when another remaining image processing apparatus of the plurality of image processing apparatuses on the network receives a new job, the another remaining image processing apparatus retrieves the shared setting information from the single one image processing apparatus.

2. The image processing system according to claim 1, further comprising:
a display that displays an image,
wherein the processor receives the shared setting information by displaying, on the display, an operation screen of the one virtual apparatus, which is the single screen and has all the functions provided by the plurality of image processing apparatuses on the network.

3. The image processing system according to claim 2, wherein the processor receives settings of functions to be used by one of the plurality of image processing apparatuses and, when receiving the functions to be used by the one of the plurality of image processing apparatuses, displays a function provided by the one of the plurality of image processing apparatuses and a function that is not provided by the one of the plurality of image processing apparatuses on a display of the one of the plurality of image processing apparatuses in different modes.

4. The image processing system according to claim 3, wherein, when the function that is not provided by the one of the plurality of image processing apparatuses is replaceable by another function, the processor replaces the function with the other function and displays the other function in a mode different from a mode in which a function that has not been replaced is displayed.

5. The image processing system according to claim 4, wherein, if receiving a setting of a function to be used by the one of the plurality of image processing apparatuses, the processor updates the shared setting information with the received setting of the function or holds the received setting of the function as unique setting information, which is uniquely used in the one of the plurality of image processing apparatuses.

6. The image processing system according to claim 5, wherein the processor causes the plurality of image processing apparatuses on the network to display, on the display of the one of the plurality of image processing apparatuses, positional information regarding a certain one of the plurality of image processing apparatuses that provides the function that is not provided by the one of the plurality of image processing apparatuses.

7. The image processing system according to claim 6, wherein, if receiving, for the one of the plurality of image processing apparatuses, an image processing instruction based on the function that is not provided by the one of the plurality of image processing apparatuses, the processor transfers the image processing instruction to the certain one of the plurality of image processing apparatuses.

8. The image processing system according to claim 4, wherein the processor causes the plurality of image processing apparatuses on the network to display, on the display of the one of the plurality of image processing apparatuses, positional information regarding a certain one of the plurality of image processing apparatuses that provides the function that is not provided by the one of the plurality of image processing apparatuses.

9. The image processing system according to claim 8, wherein, if receiving, for the one of the plurality of image processing apparatuses, an image processing instruction based on the function that is not provided by the one of the plurality of image processing apparatuses, the processor transfers the image processing instruction to the certain one of the plurality of image processing apparatuses.

10. The image processing system according to claim 3, wherein, if receiving a setting of a function to be used by the one of the plurality of image processing apparatuses, the processor updates the shared setting information with the received setting of the function or holds the received setting of the function as unique setting information, which is uniquely used in the one of the plurality of image processing apparatuses.

11. The image processing system according to claim 10, wherein the processor causes the plurality of image processing apparatuses on the network to display, on the display of the one of the plurality of image processing apparatuses, positional information regarding a certain one of the plurality of image processing apparatuses that provides the function that is not provided by the one of the plurality of image processing apparatuses.

12. The image processing system according to claim 11, wherein, if receiving, for the one of the plurality of image processing apparatuses, an image processing instruction based on the function that is not provided by the one of the plurality of image processing apparatuses, the processor transfers the image processing instruction to the certain one of the plurality of image processing apparatuses.

13. The image processing system according to claim 3, wherein the processor causes the plurality of image processing apparatuses on the network to display, on the display of the one of the plurality of image processing apparatuses, positional information regarding a certain one of the plurality of image processing apparatuses that provides the function that is not provided by the one of the plurality of image processing apparatuses.

14. The image processing system according to claim 13, wherein, if receiving, for the one of the plurality of image processing apparatuses, an image processing instruction based on the function that is not provided by the one of the plurality of image processing apparatuses, the processor transfers the image processing instruction to the certain one of the plurality of image processing apparatuses.

15. A non-transitory computer readable medium storing a program causing a computer to execute a process for processing an image, the process comprising:

presenting, in a single screen, all functions provided by a plurality of image processing apparatuses connected to one another on a network, the plurality of image processing apparatuses providing different functions, wherein the all functions presented in the single screen are presented as functions of one virtual apparatus; and receiving from a user, as shared setting information, settings of functions to be used by all the plurality of image processing apparatuses on the network, among all the functions presented in the single screen, wherein the shared setting information is stored in a single one of the plurality of image processing apparatuses on the network, and when another remaining image processing apparatus of the plurality of image processing apparatuses on the network receives a new job, the another remaining image processing apparatus retrieves the shared setting information from the single one image processing apparatus.

16. An image processing system comprising:

processing means for:

presenting, in a single screen, all functions provided by a plurality of image processing means connected to one another on a network, the plurality of image processing means providing different functions, wherein the all functions presented in the single screen are presented as functions of one virtual apparatus; and receiving from a user, as shared setting information, settings of functions to be used by all the plurality of image processing means on the network, among all the functions presented in the single screen, wherein the shared setting information is stored in a single one of the plurality of image processing means on the network, and when another remaining one of the plurality of image processing means on the network receives a new job, the another remaining one retrieves the shared setting information from the single one image processing means.

* * * * *